Sept. 6, 1932.  J. R. CAUTLEY  1,875,328
BRAKE
Filed Sept. 22, 1928

INVENTOR.
John R. Cautley
BY M. W. McConkey
ATTORNEY.

Patented Sept. 6, 1932

1,875,328

UNITED STATES PATENT OFFICE

JOHN R. CAUTLEY, OF SOUTH BEND, INDIANA, ASSIGNOR TO BENDIX BRAKE COMPANY, OF SOUTH BEND, INDIANA, A CORPORATION OF ILLINOIS

BRAKE

Application filed September 22, 1928. Serial No. 307,662.

This invention relates to brakes and is illustrated as embodied in a two-shoe internal expanding type of automotive brake.

It is the prime desideratum in the braking of a moving automotive vehicle that the deceleration be accomplished with the least expenditure of energy on the part of the operator. With that object in view I suggest that the kinetic energy of the moving vehicle be utilized to aid in the application of the brakes and suggest that the brake comprise at least two shoe elements, one of which is so constructed as to actuate the other.

By making the actuating or servo shoe of relatively flexible material it readily conforms to the brake drum contour and because of its flexibility is urged into motion by the revolving drum, thus absorbing a portion of the drum's excessive kinetic energy. Once in motion the flexible shoe serves to apply the second shoe of my proposed brake which I prefer to make relatively rigid to obviate the possibility of buckling, as well as the grabbing or locking of the complete unit.

It is, therefore, the principal object of my invention to provide a brake comprising at least two friction elements, one a flexible shoe and a rigid shoe connected thereto by a floating articulating pivot. The shoes may either float as a unit and selectively anchor at either end of the same or they may be fixedly anchored at one end to the unit, the remaining end to be free. In either event a suitable applying means is interposed between the ends of the unit to expand the same into drum contact.

Figure 1:
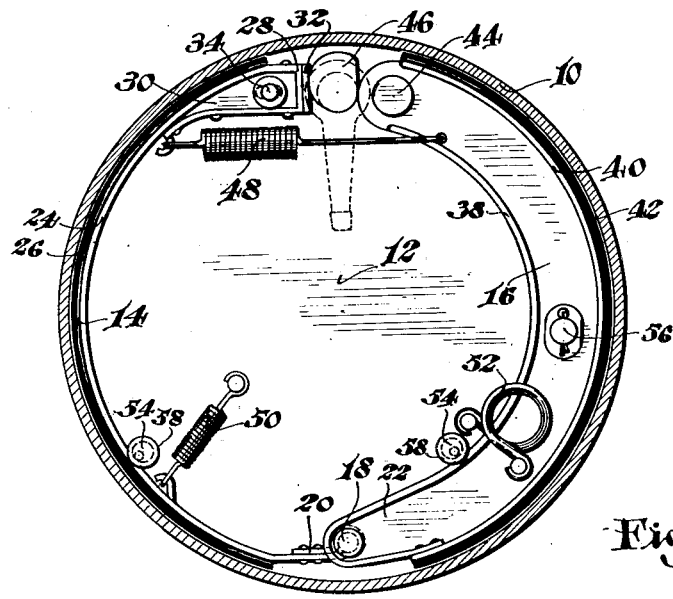
Figure 2:
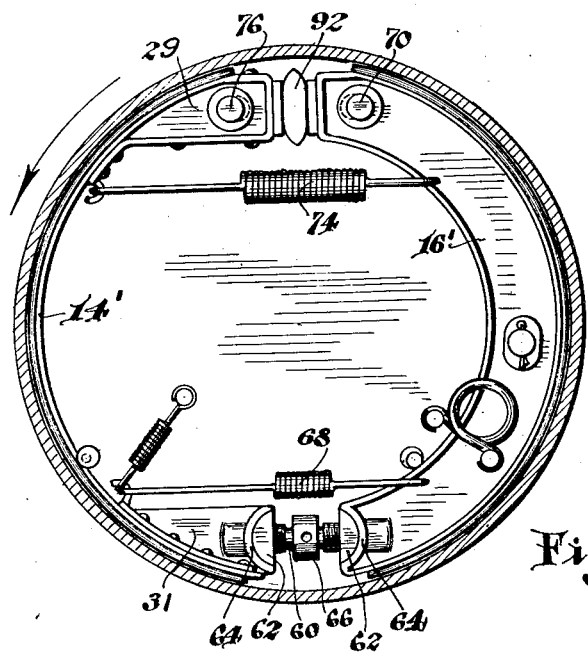

Further desirable particular constructions and combinations of parts will be made evident from the more detailed description hereafter given, together with the illustrated embodiments disclosed in the accompanying drawing, in which:

Figure 1 is a view taken just inside the head of the brake drum, indicating one species of my novel brake in side elevation; and Figure 2 is a similar view of a second embodiment of the invention.

In the embodiment of my invention illustrated in Figure 1, 10 indicates the usual brake drum at the open side of which I provide a suitable support such as a backing plate 12 to support my novel friction device. The device disclosed preferably includes two friction retarding elements 14 and 16 pivotally connected as by a pivot pin 18, the latter embraced by a return bent wrapped portion 20 of element 14 and the spaced web portions 22 of element 16. Friction element 14 is preferably characterized by a relatively flexible steel band 24, covered with suitable brake lining material 26 and return bent at its cam engaging end 28 to house a web 30 which latter elements serve respectively to support a cam thrust plate 32 and headed guide pin 34.

Friction element 16 is preferably made substantially rigid as compared to the flexible band 14 and may comprise the spaced webs 22 straddling the band 14, reinforced at their edges by laterally turned flanges 38 and supporting a rim 40, the latter covered by suitable lining material 42. A pivot pin 44, suitably secured to the backing plate, is preferably passed through the ends of the webs 22 adjacent the applying means to anchor the friction element, thereby providing a means for transmitting the braking torque to the supporting backing plate.

The brake may be applied by a suitable applying means 46 such as an involute cam rotatably mounted and, with its shaft, having suitable bearing in the backing plate, which cam upon rotation serves to force the flexible shoe 14 laterally into drum engagement against the action of return springs 48, 50 and 52.

It will be noted that the principal return spring 48 urges, when the brake is released, the friction element 14 against the cam face and that supplemental springs 50 and 52, the latter a torsion spring, serve to urge both friction elements against eccentric adjustable stops 54. Stops 54 serve to determine the idle position of the brake unit and may, by suitable adjustment, predetermine the clearance between the lining and drum. A pin 56, suitably headed and secured to the backing plate passes through an enlarged opening in the shoe 16 and, together with heads 58 on the eccentric stops 54, confine the elements laterally, acting as so-called steady rests.

In operation, application of the cam to the flexible shoe brings the latter into drum contact and because of its distortability closely contacts the drum irrespective of its contour.

The band, in addition to its braking action, serves to apply the rigid shoe, having been put into motion by the revolving drum absorbing a portion of its kinetic energy. The pedal pressure is thus supplemented by the revolving band, the inertia of which aids in the application of the rigid shoe. A very serviceable and efficient brake is thus provided, one particularly fitted for airplane use where reverse braking is not desired, it being understood that the flexible band is the forward braking element as disclosed and that the drum is turning counterclockwise.

The modification disclosed in Figure 2 is identical with that just described with the following exceptions to be noted. Both friction elements are floating with respect to the backing plate and may be adjustably connected by a right and left threaded bolt 60 threaded into nuts 62, the latter abutting thrust plate 64 formed in the ends of the friction elements. By turning collar 66 on the bolt against the action of spring 68 an adjustment for lining clearance may be had. Rigid shoe 16 differs from that disclosed in Figure 1 in that it may comprise but a single web and is preferably slotted at its cam engaging end to house the headed anchor and guiding pin 70.

In this modification of my invention a floating double cam 92, acting against the action of return spring 74 connected to both friction elements, serves to force the elements into drum engagement and with forward braking, as indicated by the arrow in the figure, the shoes quickly anchor on pin 70. With the drum revolving clockwise as in reverse braking, the torque is taken by anchor pin 76, the rigid shoe 16 acting as the energizing or servo agent in applying the band 14. The relatively small amount of reverse braking precludes injury to the flexible band which is, however, reinforced by the end elements 29 and 31.

With forward braking the same powerful servo action of the flexible band is present here as was described in connection with the modification disclosed in Figure 1 and this brake is admirably suited for the present day pleasure cars demanding such rapid absorption of energy in the braking operation.

While but two embodiments of my invention have been described in detail, I wish it to be clearly understood that the scope of my invention is not to be limited thereby, or otherwise than by the scope of the appended claims.

I claim:

1. A brake comprising a brake support, a rigid shoe having an opening adjacent one end thereof, an anchor fixed to said support extending into said opening to provide a pivotal mounting for said shoe, a flexible shoe having one end pivoted to the rigid shoe, and a device for actuating the other end of the flexible shoe only.

2. A brake comprising a support, a rigid shoe pivotally mounted on said support, a flexible shoe pivotally connected to said rigid shoe, and means for actuating said flexible shoe only.

3. A brake comprising a support, a rigid shoe pivotally anchored to said support, a flexible shoe pivotally connected to said rigid shoe, and an actuating device positioned between said shoes, said actuating device being so arranged as to move said flexible shoe only on actuation of said device.

4. A brake comprising a brake support, a rigid shoe pivotally anchored at one end thereof to the support, a flexible shoe having one end pivoted to the rigid shoe, and an actuating device interposed between the other end of the flexible shoe and the pivoted end of the rigid shoe, said device being so constructed as to move the end of the flexible shoe only upon actuation of said device.

5. A brake comprising a drum and a fixed support, a rigid shoe pivotally anchored at one end thereof to said support, a flexible shoe, a pivotal connection between said flexible shoe and the free end of said rigid shoe, and means acting on said flexible shoe only for forcing said flexible shoe into engagement with the drum.

6. A brake comprising a brake support, an anchor on said support, a rigid brake shoe having one end mounted on said anchor for pivotal movement only, a flexible shoe having one end thereof pivotally connected to the free end of the rigid shoe, and means for actuating the other end of the flexible shoe only.

7. A brake comprising a support, a rigid brake shoe pivotally connected to said support, said rigid shoe being rigid throughout the entire length thereof, a flexible shoe pivotally connected to said rigid shoe, and means for actuating said flexible shoe only.

In testimony whereof, I have hereunto signed my name.

JOHN R. CAUTLEY.